April 21, 1959
J. S. SCHROEDER
2,882,854
PRESSURE INDICATOR
Filed Dec. 3, 1956
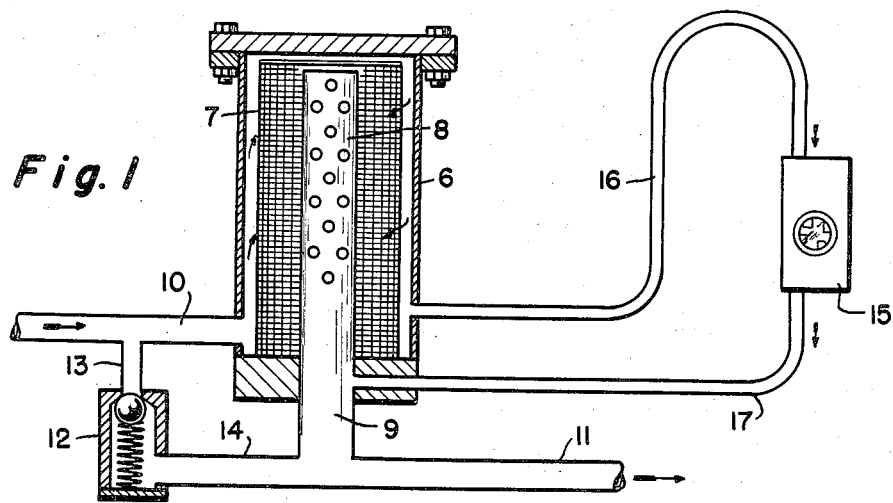
Fig. 1
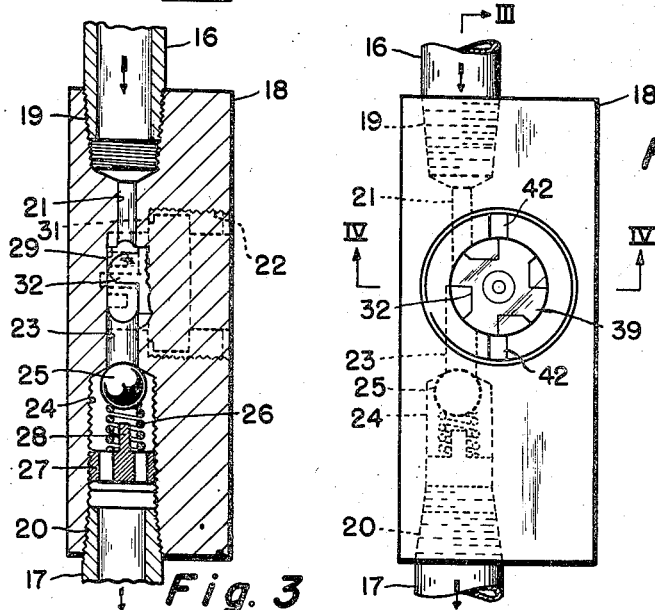
Fig. 3   Fig. 2
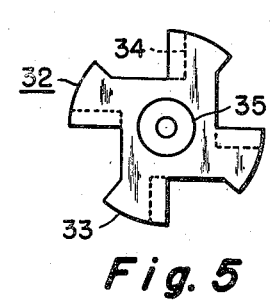
Fig. 5
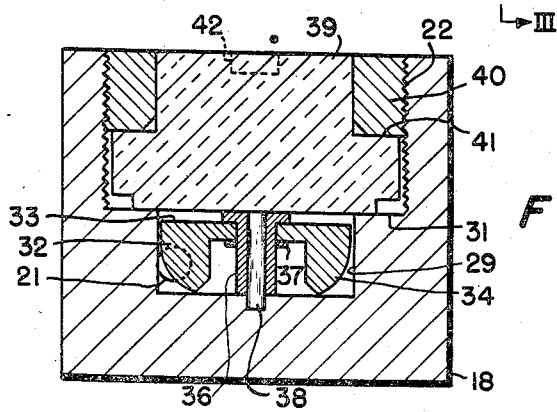
Fig. 4
INVENTOR.
John S. Schroeder
BY
HIS ATTORNEYS United States Patent Office 2,882,854
Patented Apr. 21, 1959

2,882,854

PRESSURE INDICATOR

John S. Schroeder, Edgeworth, Pa., assignor to Schroeder Brothers Corporation, Pittsburgh, Pa., a corporation of Pennsylvania Application December 3, 1956, Serial No. 625,740

4 Claims. (Cl. 116—117)

This application relates to a pressure indicator, more specifically a pressure indicator for use in fluid systems whereby a visual signal is given when the difference in pressure between two points in a system reaches a predetermined value. The pressure indicator is particularly useful in connection with filters used in hydraulic systems and, therefore, it will be described with reference thereto, although it is to be understood that it may be used whenever a visual signal is desired to indicate that a difference in pressure between two points in a fluid system has reached a predetermined value.

In all hydraulic systems where fluid flows through machinery either for the purpose of lubricating the machinery or for driving the machinery, it is obviously desirable that the fluid be kept as clean as possible by filtering the fluid. However, filters have not been used as extensively as they should be because of difficulties with the filter. A prime reason for not using a filter in a hydraulic system is that it is difficult to know prior to complete clogging and failure of the filter when the filter element of the filter should be replaced or cleaned without dismantling the filter. It has been proposed to place pressure gauges on the inlet and outlet sides of the filter to indicate a drop in pressure across the filter. As the filter becomes increasingly dirty with use, the difference in pressure between the inlet and outlet sides increases, reaching a maximum when the filter becomes completely clogged. Accordingly, by referring to the pressure gauges, an operator can determine that the pressure drop across the filter is such that the filter should be changed. This arrangement, however, is unsatisfactory because it calls for relatively expensive instruments which are easily damaged. The possibility of damage is an important consideration in many applications of hydraulic systems, for example hydraulic systems used for driving coal mining equipment.

In order to protect the system from complete clogging of the filter, it has also been proposed to provide a relief valve across the inlet and outlet passages of the filter, which relief valve opens before the filter becomes completely clogged. Such an arrangement, however, has a serious defect in that, when the relief valve is opened, the filter is completely bypassed, with the result that dirty fluid flows through the system.

I have invented a simple, inexpensive, rugged instrument which gives a visual signal when the pressure drop across a filter is such that the filter element should be cleaned or replaced. The device can be set at any predetermined value so that an operator will know when to clean a filter prior to clogging or prior to the opening of a relief valve bypassing the filter if such a relief valve is provided in the system.

In the accompanying drawings, I have illustrated a presently preferred embodiment of my invention, in which:

Figure 1 is a diagram, partially in section, showing my pressure indicator connected to a conventional filter;

Figure 2 is a plan view of my device;

Figure 3 is a section along the lines III—III of Figure 2;

Figure 4 is a section along the lines IV—IV of Figure 2; and

Figure 5 is a plan view of a spinner used in my device.

In Figure 1, I have shown a conventional filter having a cylindrical casing 6 within which is a filter element 7 surrounding a perforated pipe 8 which leads to an outlet 9. Fluid in the system in which the filter is installed is supplied to the filter through an inlet 10 and flows through the filter element 7 where it is cleaned, into the pipe 8, and then through the outlet 9 to a pipe 11 which leads the fluid back to the system. The outside diameter of the element 7 is smaller than the inside diameter of the casing 6 to provide an annular space in which incoming fluid flows to surround the element 7.

The filter shown in Figure 1 also has a relief valve 12 which is connected across the inlet and outlet of the filter by pipes 13 and 14. When the filter element 7 becomes so filled with dirt and other foreign matter that the difference in pressure between the inlet and outlet of the filter reaches a predetermined value, the relief valve 12 opens, thus bypassing the filter.

The arrangement so far described is conventional. To the filter just described, I add my pressure indicating device, which is designated generally by the reference number 15 in Figure 1. A small tube 16 is connected to the casing 6 and leads to my indicating device 15. It will be noted that the tube 16 is connected directly to the space in the casing 6 on the outside of the filter element 7 so that fluid in the tube 16 is subject to the pressure at the inlet 10. A small tube 17 leads from the indicating device 15 and is connected into the outlet 9. Pressure in the tube 17, therefore, is subject to the pressure in the outlet 9 on the outlet side of the filtering element 7.

As will be explained in detail later, my pressure indicator has a passageway which connects the tubes 16 and 17 so that fluid can flow through the two tubes from the inlet side of the filter element to the outlet side. In that passageway, I provide a relief valve which can be adjusted to open at any predetermined value. I also provide a spinner which is positioned in the passageway so that it rotates whenever there is a flow of fluid through the indicator.

By reason of the connections just described, the relief valve within the indicator is exposed to whatever pressure difference exists between the inlet and outlet sides of the filter and, by the same token, to any increase in this pressure difference which results from gradual filling up of the filter element. I set the relief valve to open upon a difference in pressure between the inlet and outlet sides of the filter which is less than that which would result if the filter became so clogged as to be inefficient. When the relief valve opens, fluid flows through the passageway in the indicator and this flow causes the spinner to turn, thus providing a visual warning signal that the difference in pressure between the inlet and outlet sides of the filter has reached such a value that the filter element should be cleaned or replaced.

Figures 2 to 4 show my flow indicator. It comprises a body 18 having an inlet 19 which is threaded to receive the tube 16 and an outlet 20 which is threaded to receive the tube 17. The inlet 19 leads to a small bore 21 which in turn leads to a cross bore 22 in which the spinner is housed, as will be hereinafter described. A second bore 23 leads from the bore 22 into a bore 24 of increased diameter and having the outlet 20 at its outer end.

The relief valve is positioned in the bore 24. It comprises a ball 25 which seats on a shoulder formed by the bores 23 and 24 which is beveled to form a ball seat. It is held against the shoulder by a spring 26 which in turn is positioned in the bore 24 against the ball by a spider 27 having a central stud or post 28 which extends inside the spring 26. The bore 24 is internally threaded and the spider 27 is externally threaded to fit the threads in the bore 24 so that the pressure of the spring 26 against the ball 25 can be adjusted by turning the spider 27 and thus moving it towards and away from the ball. The relief valve can thus be adjusted to open over a range of pressure differences.

The cross bore 22 in which the spinner is mounted has a reduced bore 29 at its inner end at the same depth in the body 18 as the passageways 21 and 23. The bore 29 connects the passageways 21 and 23 to provide a continuous passage through the body 18 and it forms a shoulder 31 with the bore 22. A spinner 32 is also rotatably mounted in the reduced portion 29.

Referring to Figure 5, it will be seen that the spinner 32 is made from a flat circular disc 33 from which four peripheral portions have been cut out at equal distances around the center of the disc and bent at right angles to the plane of the disc to form blades 34. A hollow eyelet 35 positioned in the center of the disc 33 forms a hub 36 for the spinner. The eyelet is held in the disc by a self-locking retaining ring 37. The spinner turns in the bore 29 about a pin 38, one end of which is seated in the body 18.

A circular disc 39 of transparent material, such as glass or "Plexiglas," closes the open end of the bore 29. The disc rests on the shoulder 31 and is held against the shoulder by an annular ring 40. The outer portion of the disc 39 is reduced in diameter so as to form a shoulder 41 against which the ring 40 can press. The interior of the bore 22 and the exterior of the ring 40 are threaded so that the ring 40 can be turned in the bore 22 against the disc 39 to hold it in place against the shoulder 31. The ring 40 has diametrically opposed slots 42 to receive a tool for turning the ring.

Referring to Figure 3, it will be seen that the bore 29 lies at the same depth in the block 18 as the bores 21 and 23, but, referring to Figure 2, it will be seen that the central axes of the bore 29 and of the pin 38 about which the spinner turns are offset from the axes of the bores 21 and 23. Therefore, when fluid flows through the bores 21 and 23, it strikes the blades 34 of the spinner and causes it to rotate. The rotation, of course, can be seen through the transparent disc 39.

As has been explained, I set the relief valve in my pressure indicator so that it will open whenever the pressure difference between the inlet and outlet sides of the filter reaches a value such that the filter element should be cleaned or replaced. When the valve opens, fluid flowing through the indicator rotates the spinner and thus gives an operator a visual signal that something should be done about the filter.

If the filter has a main relief valve, such as is shown in Figure 1, I set the relief valve in my indicator to open at a pressure difference below that at which the main relief valve opens. Thus, an operator is warned that the filter should be cleaned or replaced before the main relief valve opens and bypasses the filter and permits dirty fluid to pass through the system. The main relief valve then acts only as a safety device in the event that an operator ignores the warning given by my pressure indicator.

As has been explained, whenever my indicator gives a warning, it, in effect, bypasses the filter. However, the flow capacity of the tubing 16 and 17 is much less than the flow capacity of the main filter and of the inlet and outlet lines of the filter so that only a small amount of fluid is bypassed around the filter into the system.

From the foregoing, it is apparent that I have invented a simple pressure indicator of sturdy construction. It may be readily manufactured at low cost and gives a positive visual warning whenever required. Since it is connected to the filter by small tubing, it can be placed wherever desired, for example on a control panel positioned some distance from the filter. Alternatively, it can be made integral with the filter.

While I have described a presently preferred embodiment of my invention, it is to be understood that it may be otherwise embodied within the scope of the appended claims.

I claim:

1. A signaling device comprising a main conduit, a flow resistive element in said main conduit, a bypass conduit connecting to said main conduit on opposite sides of said flow resistive element and a flow indicator and a pressure responsive valve in said bypass conduit, said valve opening when the difference in pressure in the main conduit on opposite sides of said flow meter reaches a predetermined value.

2. A signaling device as described in claim 1, in which the flow indicator comprises a spinner rotatable by the flow of fluid through the bypass conduit and a transparent portion in the side wall of said conduit adjacent the spinner.

3. A signaling device as described in claim 1, in which the bypass conduit has a flow capacity less than that of the main conduit.

4. A signaling device as described in claim 1, in which the flow resistive element is a filter and in which said pressure responsive valve opens when the difference in pressure on opposite sides of said filter reaches a value below that difference in pressure between opposite sides of the filter which develops when the filter is clogged.

References Cited in the file of this patent

UNITED STATES PATENTS

| 146,745 | Blanchard | Jan. 27, 1874 |
| 802,436 | Van Order | Oct. 24, 1905 |
| 1,765,956 | Wertz | June 24, 1930 |
| 2,145,304 | Hill | Jan. 31, 1939 |
| 2,387,805 | Olsen | Oct. 30, 1945 |
| 2,611,448 | Walls | Sept. 23, 1952 |